US011463846B2

(12) United States Patent
Wang et al.

(10) Patent No.: US 11,463,846 B2
(45) Date of Patent: Oct. 4, 2022

(54) METHOD AND APPARATUS FOR TRANSMITTING V2X MESSAGE

(71) Applicant: Samsung Electronics Co., Ltd., Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd

( * ) Notice: Subject to any disclaimer, the term of this patent is extended or adjusted under 35 U.S.C. 154(b) by 186 days.

(21) Appl. No.: 17/106,923

(22) Filed: Nov. 30, 2020

(65) Prior Publication Data

US 2021/0084453 A1 Mar. 18, 2021

Related U.S. Application Data

(63) Continuation of application No. 16/089,854, filed as application No. PCT/KR2017/003055 on Mar. 22, 2017, now Pat. No. 10,856,112.

(30) Foreign Application Priority Data

Apr. 1, 2016 (CN) .......................... 201610204458.8

(51) Int. Cl.
*H04W 4/06* (2009.01)
*H04W 76/40* (2018.01)
(Continued)

(52) U.S. Cl.
CPC .............. *H04W 4/06* (2013.01); *H04L 45/38* (2013.01); *H04W 4/021* (2013.01); *H04W 4/40* (2018.02);
(Continued)

(58) Field of Classification Search
CPC ......... H04W 4/06; H04W 76/11; H04W 4/40; H04W 76/40; H04W 4/021; H04W 40/023; H04W 40/20; H04L 45/38
See application file for complete search history.

(56) References Cited

U.S. PATENT DOCUMENTS 10,327,252 B2 * 6/2019 Byun .................... H04L 5/0053
10,856,112 B2 * 12/2020 Wang .................... H04W 40/20
(Continued)

FOREIGN PATENT DOCUMENTS

WO WO 2014/048486 4/2014
WO WO 2015/167266 11/2015

OTHER PUBLICATIONS

ETSI TR 102 962 V1.1.1, Intelligent Transport Systems (ITS); Framework for Public Mobile Networks in Cooperative (C-ITS), Feb. 2012 (pp. 64).
(Continued)

*Primary Examiner* — Michael J Moore, Jr.
(74) *Attorney, Agent, or Firm* — The Farrell Law Firm, P.C.

(57) ABSTRACT

A communication method and system are provided for converging a 5G communication system with technology for IoT. The disclosure may be applied to intelligent services based on the 5G communication technology and the IoT-related technology, such as smart home, smart building, smart city, smart car, connected car, health care, digital education, smart retail, security and safety services. A method performed by a V2X includes receiving, from a terminal, a V2X message including location information on the terminal; determining a first MBMS broadcast area for a V2X service based on the location information on the terminal; transmitting, to a BMSC, a first request message for the V2X service including information on the first MBMS broadcast area and a first TMGI for the V2X service,
(Continued)

wherein the information on the first MBMS broadcast area includes at least one MBMS SAI mapped to the location information on the terminal; and transmitting, to the BMSC, a second request message for the V2X service, the second request message including information on a second MBMS broadcast area for broadcasting second MBMS data for the V2X service and the first TMGI. The first MBMS data is broadcast within the first MBMS broadcast area, and the first TMGI is used for the second MBMS data, in case that the first MBMS broadcast area does not overlap the second MBMS broadcast area.

20 Claims, 10 Drawing Sheets

(51) Int. Cl.

| | | |
|---|---|---|
| H04W 4/40 | (2018.01) | |
| H04W 76/11 | (2018.01) | |
| H04W 4/021 | (2018.01) | |
| H04L 45/00 | (2022.01) | |
| H04W 40/02 | (2009.01) | |
| H04W 40/20 | (2009.01) | |

(52) U.S. Cl.
CPC ......... *H04W 40/023* (2013.01); *H04W 40/20* (2013.01); *H04W 76/11* (2018.02); *H04W 76/40* (2018.02)

(56) References Cited

U.S. PATENT DOCUMENTS

| | | | | |
|---|---|---|---|---|
| 2005/0076369 | A1* | 4/2005 | Cai | H04N 21/4882 348/E7.071 |
| 2007/0213081 | A1* | 9/2007 | Zhang | H04W 72/005 455/466 |
| 2010/0208641 | A1* | 8/2010 | Guo | H04W 76/40 370/312 |
| 2011/0211515 | A1* | 9/2011 | Zeller | H04W 72/005 370/312 |
| 2011/0305183 | A1 | 12/2011 | Hsu et al. | |
| 2013/0279394 | A1* | 10/2013 | Aramoto | H04L 12/189 370/312 |
| 2013/0301509 | A1* | 11/2013 | Purnadi | H04W 36/0007 370/312 |
| 2014/0011514 | A1 | 1/2014 | Gu et al. | |
| 2014/0140237 | A1* | 5/2014 | Ma | H04W 24/08 370/252 |
| 2014/0301267 | A1* | 10/2014 | Gou | H04L 65/611 370/312 |
| 2015/0208379 | A1 | 7/2015 | Lin | |
| 2015/0257127 | A1* | 9/2015 | Huarui | H04W 4/70 370/312 |
| 2015/0296411 | A1 | 10/2015 | Meyer et al. | |
| 2015/0327156 | A1* | 11/2015 | Ramkumar | H04W 48/16 370/312 |
| 2016/0014572 | A1* | 1/2016 | Vetter | H04W 4/06 370/312 |
| 2016/0073302 | A1* | 3/2016 | Yang | H04W 36/0061 370/331 |
| 2016/0080163 | A1* | 3/2016 | Taylor | H04W 4/024 370/312 |
| 2016/0316351 | A1* | 10/2016 | Kodaypak | H04L 65/611 |
| 2016/0323784 | A1* | 11/2016 | Ma | H04W 72/042 |
| 2016/0337184 | A1* | 11/2016 | Linden | H04W 4/06 |
| 2017/0041752 | A1* | 2/2017 | Baek | H04W 4/06 |
| 2017/0054568 | A1 | 2/2017 | Lee et al. | |
| 2017/0251342 | A1* | 8/2017 | Bhalla | H04W 4/14 |
| 2018/0109911 | A1* | 4/2018 | Chandramouli | H04W 4/02 |
| 2018/0270624 | A1* | 9/2018 | Lee | H04W 76/40 |
| 2018/0295671 | A1* | 10/2018 | Kim | H04W 8/00 |
| 2018/0324560 | A1* | 11/2018 | Xu | H04W 28/24 |
| 2018/0352387 | A1* | 12/2018 | Kim | H04W 48/10 |
| 2019/0090099 | A1* | 3/2019 | Wang | H04W 76/11 |
| 2019/0123926 | A1* | 4/2019 | Xu | H04L 45/16 |
| 2019/0124489 | A1* | 4/2019 | Ahmad | H04W 4/80 |
| 2019/0124623 | A1* | 4/2019 | Xu | H04W 76/40 |

OTHER PUBLICATIONS

Anis, Muhammad Moiz et al., Overview of evolved Multimedia Broadcast Multicast Services (eMBMS), HAL id: hal-01291201, Mar. 2016 (pp. 52).
PCT/ISA/210 Search Report issued on PCT/KR2017/003053 (pp. 3).
PCT/ISA/237 Written Opinion issued on PCT/KR2017/003053 (pp. 9).
Chinese Office Action dated Apr. 13, 2020 issued in counterpart application No. 201610204458.8, 22 pages.
Jordi Calabuig et al., "Safety on the Roads: LTE Alternatives for Sending ITS Messages", IEEE Vehicular Technology Magazine, Dec. 1, 2014, 10 pages.
European Search Report dated Oct. 31, 2018 issued in counterpart application No. 17775722.6-1213, 9 pages.

* cited by examiner

FIG. 5

| Bits | | | | | | | | octal | | |
|---|---|---|---|---|---|---|---|---|---|---|
| 7 | 6 | 5 | 4 | 3 | 2 | 1 | 0 | | | |
| PDU type (=2) | | | | V2X flow ID | | | IPv6 indic | 1 | Frame Control Part | |
| timestamp | | | | | | | | 2 | | |
| data packet number | | | | | | | | 2 | | |
| cumulative byte number | | | | | | | | 4 | | |
| PDCP information | | | | | | | | 1 | | |
| uncompressed Payload IP header | | | | | | | | 20(40) | | |
| Header CRC | | | | | Payload CRC | | | 2 | Frame Check Sum Part | |
| Payload CRC | | | | | | | | | | |
| Payload Fields | | | | | | | | 1-n | Frame Payload Part | |
| Payload Fields | | Padding | | | | | | 0-4 | | |
| | | Spare extension | | | | | | | | |

METHOD AND APPARATUS FOR TRANSMITTING V2X MESSAGE

PRIORITY

This application is a Continuation of U.S. application Ser. No. 16/089,854, which was filed in the U.S. Patent and Trademark Office on Sep. 28, 2018, which is a National Phase Entry of PCT International Application No. PCT/KR2017/003053 which was filed on Mar. 22, 2017, and claims priority to Chinese Patent Application No. 201610204458.8, which was filed on Apr. 1, 2016, the entire content of each of which is incorporated herein by reference

BACKGROUND

1. Field

The present disclosure relates to wireless communications technologies, and more particularly, to a method and an apparatus for transmitting a vehicle to everything (V2X) message via an enhanced Multimedia Broadcast Multimedia. Service (eMBMS) bearer.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) hands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communications tend to provide multimedia services for users with high transmission rates. FIG. 1 shows a system structure of System Architecture Evolution (SAE) according to the prior art, in which:

User Equipment (LE) 101 is a terminal device used for receiving data. Evolved Universal Terrestrial Radio Access Network (E-UTRAN) 102 is a radio access network, including an eNodeB/NodeB which provides an interface for the UE to access the radio network. Mobility Management Entity (MME) 103 is responsible for managing mobility context, session context and security information of the UE. Serving Gateway (SGW) 104 is mainly used for providing a user plane function. The MME 103 and the SGW 104 may be in a same physical entity. Packet data network Gateway (PGW) 105 is responsible for charging, legal listening and other functions. The PGW 105 may also be in the same physical entity with the SGW 104. Policy and Charging Rule Function (PCRF) 106 provides Quality of Service (QoS) policies and charging rules. Serving CPRS Support Node (SGSN) 108 is a network node device for providing route for data transmission in a Universal Mobile Telecommunications System (UMTS). Home Subscriber Server (HSS) 109 is a home sub-system of the UE, and is responsible for protecting user information such as current location, serving node location, user security information and packet data context of the user device.

With rapid increasing of vehicle population, road safety issues have become increasingly prominent. Faced with frequent traffic accidents, traditional methods used for reducing road traffic accidents such as enhancing the transport infrastructure, enhancing traffic safety education have become increasingly limited. Under this background, it is necessary to utilize the information communication technique method, to enhance people's awareness about the surroundings of the vehicle via communications between vehicles or between vehicle and road infrastructure. When road risk is detected, the driver and other vehicles may be provided with warning in time to avoid traffic collision. This is a key technique of further intelligent transportation systems, which is referred to as V2X, i.e., vehicle to everything. Through the V2X technique, it is possible to effectively reduce the loss brought about by traffic accidents.

V2X includes Vehicle-to-Vehicle (V2V), Vehicle-to-Infrastructure (V2I) and Vehicle-to-Pedestrian (V2P). The three V2X communication schemes provide intelligent services for drivers via sensing each other. Information transmission facilities (such as vehicles, road infrastructure or pedestrian) can collect adjacent environment information, by utilizing information transmitted by another vehicle or a sensor. Through sharing the information, intelligent services can be provided, e.g., collision warning or automatic driving. These intelligent services may be divided into three classes.

The first class relates to road safety, including: 1, when a vehicle finds a danger, e.g., there is an obstacle ahead, the vehicle is able to remind other vehicles in time; 2, the vehicle is able to inform others its driving way to help other vehicles to make more accurate decision; 3, provide warning to others when getting close to an intersection; 4, provide warning to others with leaving highway; 5, provide warning to others for temporary/emergency stop; 6, provide warning for vehicle lane change; 7, accident report; 8, warning provided by a car driver to roadside pedestrians/cyclists.

The second class relates to traffic efficiency, including improvement of traffic fluidity and performing effective measures to solve congestions in real time. The management department may apply traffic rules flexibly according to some detailed conditions, e.g., adjustable speed limit, variable traffic light periodicity and light sequence, intersection automatic vehicle control, way clearing for ambulance/fire engine/police car.

The third class relates to other applications, e.g., intelligent traffic can provide automatic parking, navigation status and road sign recognition, etc. For the law enforcement department such as the police, the V2X is helpful for the implementation of monitoring, speed limit breaking warning, restricted area management, ordering to stop, etc. Through the electronic payment, the V2X makes the charging for the road toll and parking fees more convenient, which reduces vehicle congestion to some extent and reduce the low-speed rear-end collisions frequently happen at the toll gate.

For the V2V service, the E-UTRAN enables the UE (for the V2X service, the vehicle may act as the UE, the same applies in the following) to exchange V2V relevant information with other adjacent UEs. The exchanging of the V2V relevant information needs to meet the authentication and proximity principle of the E-UTRAN. The proximity principle is configured by the operator. The UE is able to exchange the V2V relevant information even if it is not in the E-UTRAN serving area. The UE supporting the V2V application transmits application layer information, e.g., position and attribute of the UE. The length of the V2V application layer message is variable, so as to be fit for different information contents. The operator may configure that the V2V message is transmitted periodically. The V2V messages are mainly broadcast messages. The V2V message may be directly transmitted to the nearby UEs, or transmitted to other UEs via a Road Side Unit (RSU).

For the V2I service, the UE supporting the V2I application transmits application layer information to the RSU. The RSU transmits the application layer information to a set of UEs supporting the V2I application, or to one UE supporting the V2I application.

For the V2P service, the E-UTRAN enables the UE to exchange V2P relevant information with other adjacent UEs. The exchanging of the V2P relevant information needs to meet the authentication and proximity principle of the E-UTRAN. The proximity principle is configured by the operator. The UE is able to exchange the V2P relevant information even if it is not in the E-UTRAN serving area. The V2P message may be directly transmitted to the nearby UEs or transmitted to other UEs via the RSU.

The V2X communication may be implemented via the application layer protocol PC5 or through the Uu interface.

The V2X possesses multiple kinds of use cases. Requirements of each kind of use case are different. Some use cases require that the V2X application layer receives a V2X message from a UE in time, and the V2X application generates a new downlink V2X message. The downlink V2X message needs to be received by all the users within a certain range. Some downlink V2X messages need to be received by users served by a base station. Transmission scope of such V2X is relevant with a specific position. For example, when a vehicle collision occurs on a certain road, the event needs to be transmitted to all the vehicles on such road.

Thus, occurrence position of a V2X event needs to be considered by a downlink V2X transmission. When an event occurs in a certain position, only corresponding adjacent areas need to be informed, which is not necessary to be broadcasted within a large range. Based on current eMBMS technologies, for the same kind of service, different contents may be broadcast within different areas. However, foregoing areas cannot be overlapped with each other. However, the MBMS service area of the V2X service needs to inform surrounding corresponding areas, based on the position for transmitting the event. For events under the same category, e.g., two vehicle collisions, corresponding areas needing to be informed may be overlapped, which cannot be implemented with current eMBMS mechanism.

SUMMARY

The present disclosure provides a method and an apparatus for transmitting a V2X message, which are not restricted by non-overlapping of service areas in the prior art, when broadcasting a downlink vehicle to everything (V2X) message.

Embodiments of the present disclosure provide a method for transmitting a V2X message, including:

receiving a V2X message reported by a vehicle;

allocating a unique flow identity (ID) for the V2X message;

transmitting a Multimedia Broadcast Multicast Service (MBMS) message to a core network (CN), wherein the MBMS message carries the flow ID and MBMS service area;

after adding the flow ID to a packet header of a MBMS data packet corresponding to the V2X message, transmitting the MBMS data packet in a downlink direction to a gateway or a base station via the CN, such that the gateway or base station forwards the MBMS data packet based on a corresponding relationship between flow ID and MBMS service area.

Embodiments of the present disclosure also provide another method for transmitting a V2X message, including:

receiving a V2X message with position information reported by a vehicle;

determining a MBMS service area corresponding to the V2X message based on the position information, transmitting a MBMS message to a gateway or a base station via a CN;

transmitting a MBMS data packet corresponding to the V2X message in a downlink direction to the gateway or the base station via the CN, such that the gateway or the base station forwards the MBMS data packet to a base station or a cell corresponding to the MBMS service area.

Embodiments of the present disclosure also provide a V2X server, including a receiving module, a MBMS service requesting module, and a transmitting module, wherein the receiving module is configured to receive a V2X message reported by a vehicle;

the MBMS service requesting module is configured to allocate a unique flow ID for the V2X message, transmit a MBMS message to a core network (CN), wherein the MBMS message comprises the flow ID and MBMS service area; and the transmitting module is configured to add the flow ID to a packet header of a MBMS data packet corresponding to the V2X message, and transmit the MBMS data packet in a downlink direction.

Embodiments of the present disclosure also provide another V2X server, including a receiving module, a MBMS service requesting module and a transmitting module;

wherein the receiving module is configured to receive a V2X message with position information reported by a vehicle;

the MBMS service requesting module is configured to determine a MBMS service area corresponding to the V2X message, based on the position information, and transmit a MBMS message to a core network (CN); and, the transmitting module is configured to transmit a MBMS data packet corresponding to the V2X message in a downlink direction.

Based on foregoing technical solutions, it can be seen that an eMBMS data transmitting entity may find a correct MBMS broadcast area, based on a flow ID, and broadcast a V2X message within a cell served by a corresponding base station. In the present disclosure, a unique flow ID is allocated to the same or V2X service, which may support broadcasting services of multiple V2X flows on the same eMBMS bearer. And broadcast areas of these V2X flows may be overlapped to some extent, which are not restricted by non-overlapping of service areas in conventional technologies.

BRIEF DESCRIPTION OF THE DRAWINGS

To describe technical solutions in the embodiments of the present disclosure more clear, brief introductions are provided for attached figures, which are necessary to be used when describing the embodiments. Obviously, attached figures in the following descriptions only illustrate some embodiments. For persons having ordinary skill in the art, other figures may be obtained based on foregoing attached figures, without paying creative work.

FIG. 5 is a schematic diagram illustrating a user plane, in accordance with Embodiment 3 of the present disclosure.

DETAILED DESCRIPTION

The technical solutions provided by various embodiments of the present disclosure will be described clearly and completely, accompanying with attached figures in the embodiments of the present disclosure. Obviously, the described embodiments are some embodiments of the present disclosure, instead of all the embodiments. Based on the embodiments in the present disclosure, all the other embodiments, which are obtained by persons having ordinary skill in the art without paying creative work, should be covered by protection scope of the present disclosure.

V2X communication generally includes an uplink transmission and a downlink transmission. The uplink transmission refers to the following contents. A vehicle (UE) transmits a V2X message to a V2X application layer. The downlink transmission refers to the following contents. The V2X application layer transmits a V2X message to a UE.

In the present disclosure, a method for transmitting a V2X message includes the following blocks.

Receive a V2X message reported by a vehicle, determine a Multimedia Broadcast Multicast Service (MBMS) service area corresponding to the V2X message;

transmit the V2X message to a cell corresponding to the MBMS service area, via an eMBMS bearer established by a core network (CN).

Figure 1:
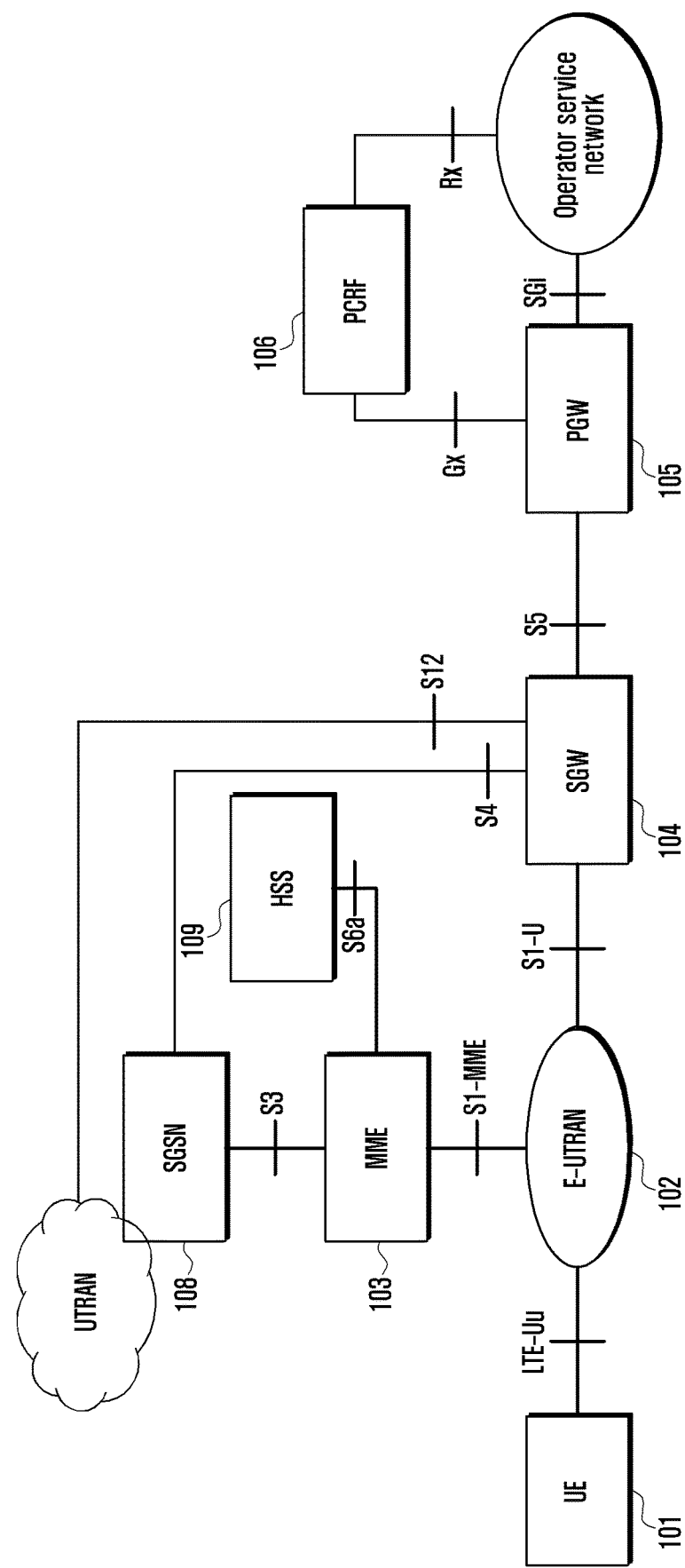
FIG. 1 is a schematic diagram illustrating a system architecture of SAE according to the prior art.
Figure 2:
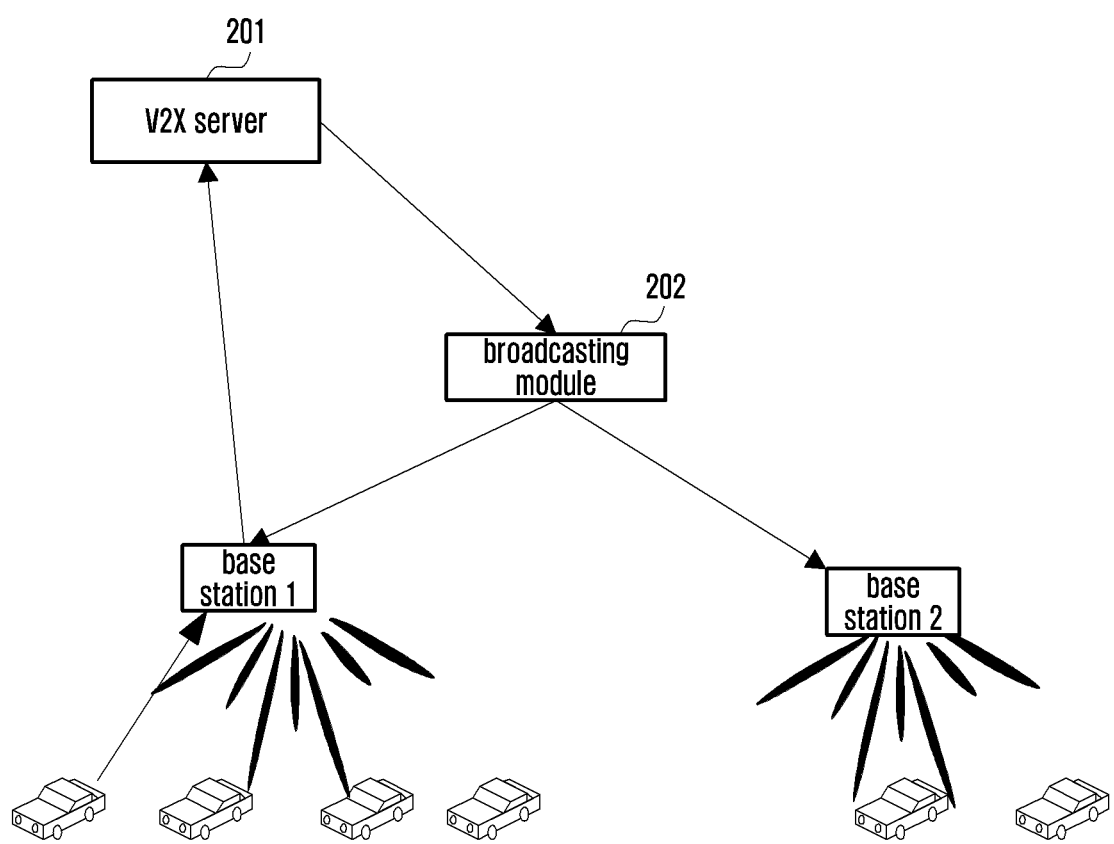
FIG. 2 is a schematic diagram illustrating a structure of a system for transmitting a V2X message, in accordance with an embodiment of the present disclosure.

As shown in FIG. 2, the uplink transmission refers to the following contents. A UE transmits a V2X message to a V2X server 201 via a base station. The downlink transmission adopts a mechanism of broadcast and multicast. The V2X server 201 generates a V2X message, and transmits the V2X message to a broadcasting module 202. The broadcasting module 202 transmits the V2X message to the base station. And then, the base station transmits the V2X message to the UE. When the V2X message needs to be broadcast by multiple base stations, the broadcasting module 202 transmits the V2X message to multiple base stations. The broadcasting module 202 refers to a logical entity, which is consisted by multiple network elements (NEs) for implementing MBMS service in the CN.

Figure 3:
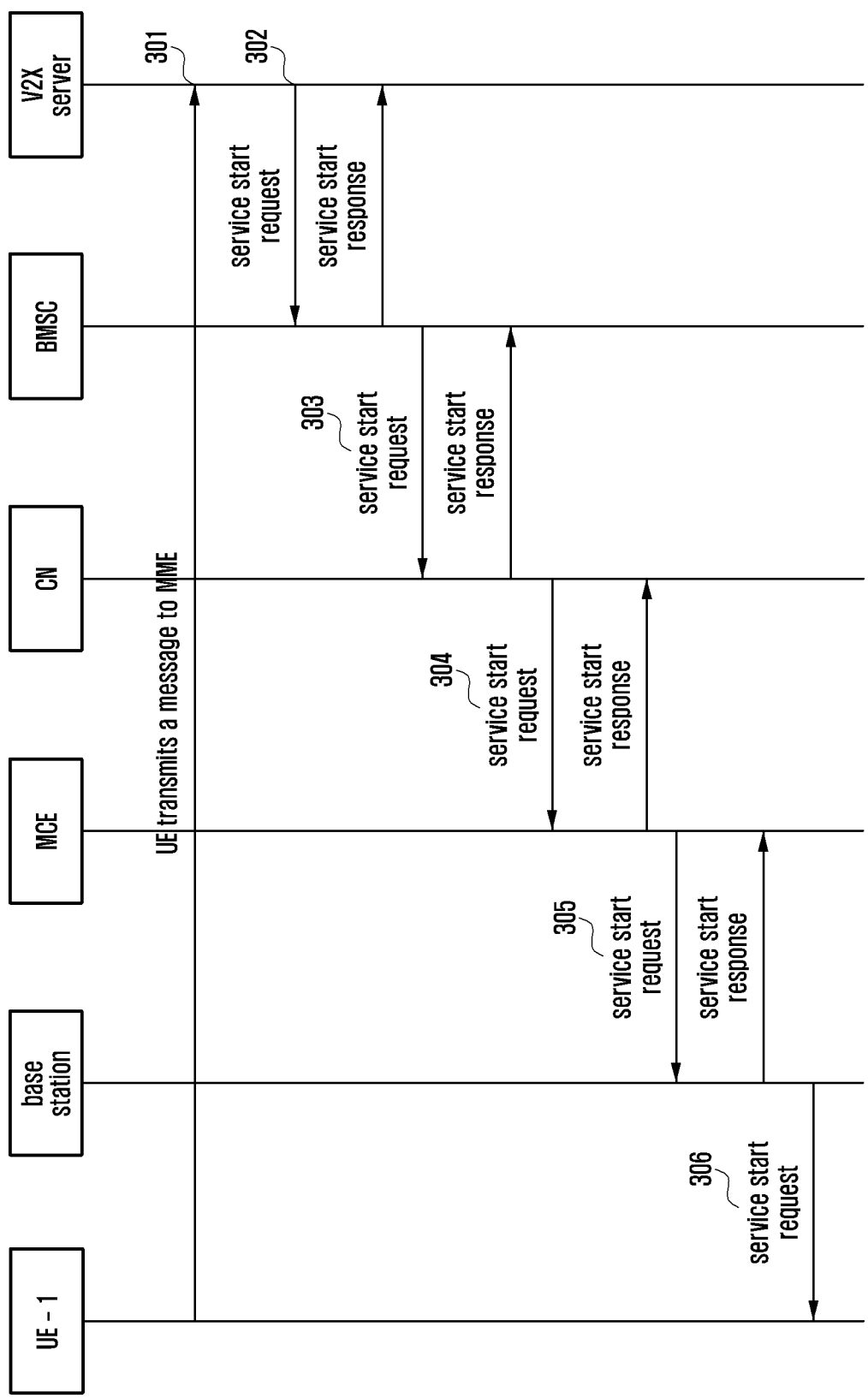
FIG. 3 is a flowchart illustrating how to exchange signaling, in accordance with Embodiment 1 of the present disclosure.

FIG. 3 is a flowchart illustrating how to exchange signaling, in accordance with Embodiment 1 of the present disclosure. FIG. 3 describes that a V2X server determines a broadcast area, based on a UE's report. When determining a range to broadcast downlink V2X data based on position reported by the UE, generally broadcast within several adjacent cells.

In the method illustrated with FIG. 3, the V2X server determines a relatively large range based on the position reported by the UE, which does not only include several adjacent cells, but also include all the cells within a certain range. For example, define a V2X service area for V2X. Each service area corresponds to a group of cells. For a V2X event reported by a UE within the service area, after being processed by a server, the V2X event needs to be broadcast within the service area. In the whole network, multiple similar service areas may be defined, which are not overlapped with each other. That is, one cell does not simultaneously belong to two different V2X service areas. Alternatively, re-use current definitions for cell or service area. The broadcast area includes a group of cells. These cells have the same service area identification (SAI), or belong to the same group of SAI. The SAI is determined based on a position for transmitting the event, that is, position information reported by the UE.

On the basis of position information corresponding to an uplink V2X message reported by a UE, a server may determine a relatively larger MBMS service area, e.g., cells indicated by a group of SAIs. Within these cells, all the V2X messages of the same type are identified by the same eMBMS bearer. That is, these eMBMS bears possess the same temporary mobile group identity (TMGI). A V2X message, which is transmitted within the area, should be broadcast within the area. When the same event occurs in another area, an eMBMS bearer with the same TMGI ID may be used to transmit the event. Contents of transmitted V2X message may be different within various cells. Advantages of such scheme are as follows. Current eMBMS transmission mechanism may be re-used. Within different areas, contents transmitted by eMRMS with the same TMGI ID may be different. Shortcomings of such scheme are a relatively larger broadcast area.

In FIG. 3, the flowchart for exchanging signaling may include the following blocks.

In block 301: a UE transmits a message to a V2X server.

The message is an application layer message, which is generally transmitted to the V2X server via a user plane. The UE may report at least one piece of the following information:

type or name of a V2X message; there are multiple kinds of V2X messages, which are applied to different scenes; a V2X message may be identified with type or name thereof;

position information of the UE; and the position information may include at least one of:

a unique cell ID, e.g., E-UTRAN Cell Global Identifier (ECGI) of a serving cell;

global positioning system (GPS) position information; when the UE is configured with GPS, the (IPS information may be reported to the V2X server;

a SAI of a service area located by the serving cell of the UE; the UE obtains the SAI of the cell from a broadcast message of the cell;

an ID of a V2X service area located by the serving cell of the UE; the UE obtains the ID of the V2X service area located by the cell from a broadcast message of the cell.

In block 302: the V2X server transmits a MBMS service start request message to a broadcast multicast service center (BMSC). In the embodiment, descriptions are provided by taking the MBMS service start request message as an example, which is not limited in the present disclosure. Other messages may also be used.

The V2X server receives the UE's report, and determines whether to transmit the event corresponding to the V2X message to other users, based on the UE's report. The foregoing determining needs to take into account the information reported by the UE, and some pre-stored information.

There may be multiple cases for the UE's position information received by the V2X server. Examples are respectively provided in the following.

When the UE's position information received by the V2X server is configured to be a unique ID of the serving cell, and type of the V2X service is a position-based broadcast service type, the V2X server determines a broadcast range, based on pre-stored information and serving cell ID reported by the UE.

For example, the V2X server pre-stores a topological relation among cells, learns which cells are deployed around a certain cell, and determines a service serving range corresponding to a serving cell, based on the serving cell reported by the UE. The service serving range includes a group of cells, which are the V2X service area. The V2X server transmits the MBMS service start request message to the BMSC. The MBMS service start request message carries a cell ID list, or a SAI list indicating service serving range. Such information indicates that the service needs to be broadcast within a corresponding cell.

When the UE's position information received by the V2X server is configured to be GPS position information, type of the V2X service belongs to position-based broadcast service type, the V2X server determines the broadcast range, based on the pre-stored information and GPS position information reported by the UE. For example, the V2X server pre-stores the GPS position information of the cell, and finds a service serving range corresponding to a cell located by an event transmission position, based on such event transmission position of the UE's report. The service serving range includes a group of cells, which are the V2X service area. The V2X server transmits the MBMS service start request message to the BMSC. The MBMS service start request message carries a cell ID list, or a SAI list indicating service serving range. Such information indicates that the service needs to be broadcast within a corresponding cell.

When the UE's position information received by the V2X server is configured to be SAI, type of the V2X service belongs to position-based broadcast service type, the V2X server determines that the broadcast range is the whole SAI. The V2X server transmits the MBMS service start request message to the BMSC. The MBMS service start request message carries the SAI ID, or an ID list. Such information indicates that the service needs to be broadcast within a cell corresponding to the SAL Each cell is allocated with a SAI. A group of corresponding cells may be found, based on the SAI ID.

When the UE's position information received by the V2X server is configured to be a V2X service area's ID, the V2X server determines that the broadcast range is this V2X serving area. The V2X server transmits the MBMS service start request message to the BMSC. The MBMS service start request message carries the V2X service area's ID. Such information indicates that the service needs to be broadcast within a cell, which corresponds to the V2X serving area. Each cell is allocated with a V2X service area's ID. A group of corresponding cells may be found, based on the V2X service area's ID.

In the embodiments of the present disclosure, the MBMS service start request message transmitted by the V2X server includes the following information:

a type of a V2X message;
a TMGI of a V2X bearer;
a broadcast range of V2X; the broadcast range may be configured to be at least one of the following:
a list showing IDs of a group of cells, such as an EGCI list;
a list showing IDs of a group of service areas, such as a SAI list;
a V2X server's ID.

In block 303: the BMSC transmits a MBMS service start request message to a CN. The MBMS service start request message includes a service ID-TMGI, a broadcast range, QoS requirements of a service. The broadcast range of the service has been described in block 302. Alternatively, the BMSC may determine a second MBMS service area, based on MBMS service area (referred to as a first MBMS service area) in block 302 and information of the BMSC. The broadcast range may be set as at least one piece of information in the following:

a list showing a group of cell IDs, such as an ECGI list;

a list showing a group of service area IDs, such as a SAI list;

a V2X server ID.

After receiving the request, the CN may transmit a MBMS service start request response message to the BMSC. Here, the CN may include a gateway and a MME. The BMSC firstly transmits the MBMS service start request message to the gateway. And then, the gateway transmits the MBMS service start request message to the MME.

In block 304: the CN transmits a MBMS service start request message to a multicast coordination entity (MCE). The MBMS service start request message carries a service ID-TMGI, MBMS service area, service quality requirements, the IP address of the gateway. The MCE determines to use a Multimedia Broadcast multicast service Single Frequency Network (MBSFN) mode, or a single-cell point-to-multipoint broadcast. And then, the MCE transmits a MBMS service start request message to a base station. When a MBMS bearer is established on at least one base station, the MCE transmits a MBMS service start request response to the MME.

In block 305: the MCE transmits a MBMS service start request message to the base station. The MBMS service start request message at least includes a service ID, e.g., TMGI, MBMS service area, service quality requirements, the IP address of the gateway.

In block 306: the base station transmits a MBMS service start request message to the UE. The base station transmits a message to the gateway of the CN, and establishes a user plane with the gateway, that is, a data bearer of MBMS. After receiving the data, the gateway may transmit a data packet to the base station via the bearer.

Until now, the first embodiment is terminated.

In the method provided by the first embodiment, divide a network into different V2X service areas in advance. The server determines to broadcast the downlink V2X message in which service area, this is a relatively static broadcast range, and is not relevant with position of the UE reporting the V2X message.

In some other embodiments of the present disclosure, a V2X server determines a broadcast range of a downlink V2X message, based on position reported by a UE. Different from the first embodiment, the broadcast range in these embodiments is determined dynamically based on the UE's position. For example, broadcast within an adjacent cell of a cell located by the UE. When the cell located by the UE is changed, the broadcast range may be changed correspondingly. To support a dynamic broadcast range, in the embodiments of the present disclosure, a unique flow ID is allocated to a V2X message, or a group of V2X messages. The base station or gateway learns the flow ID, and obtains a broadcast area corresponding to the flow ID. And then, the base station or gateway finds a cell of the corresponding base station, based on the flow ID. Specific implementations are described with multiple embodiments. The second embodiment describes how to configure a gateway, to enable the gateway to store a corresponding relationship between flow ID and broadcast area. The third embodiment describes a user plane of an eMBMS. The fourth embodiment describes a process for filtering data by a gateway. The fifth embodiment describes how to configure a base station, to enable the base station to store a corresponding relationship between flow ID and broadcast area. The sixth embodiment describes a process for filtering data by a base station. The sixth embodiment describes a process, when V2X service is stopped. Specific descriptions for these embodiments are provided in the following.

Figure 4:
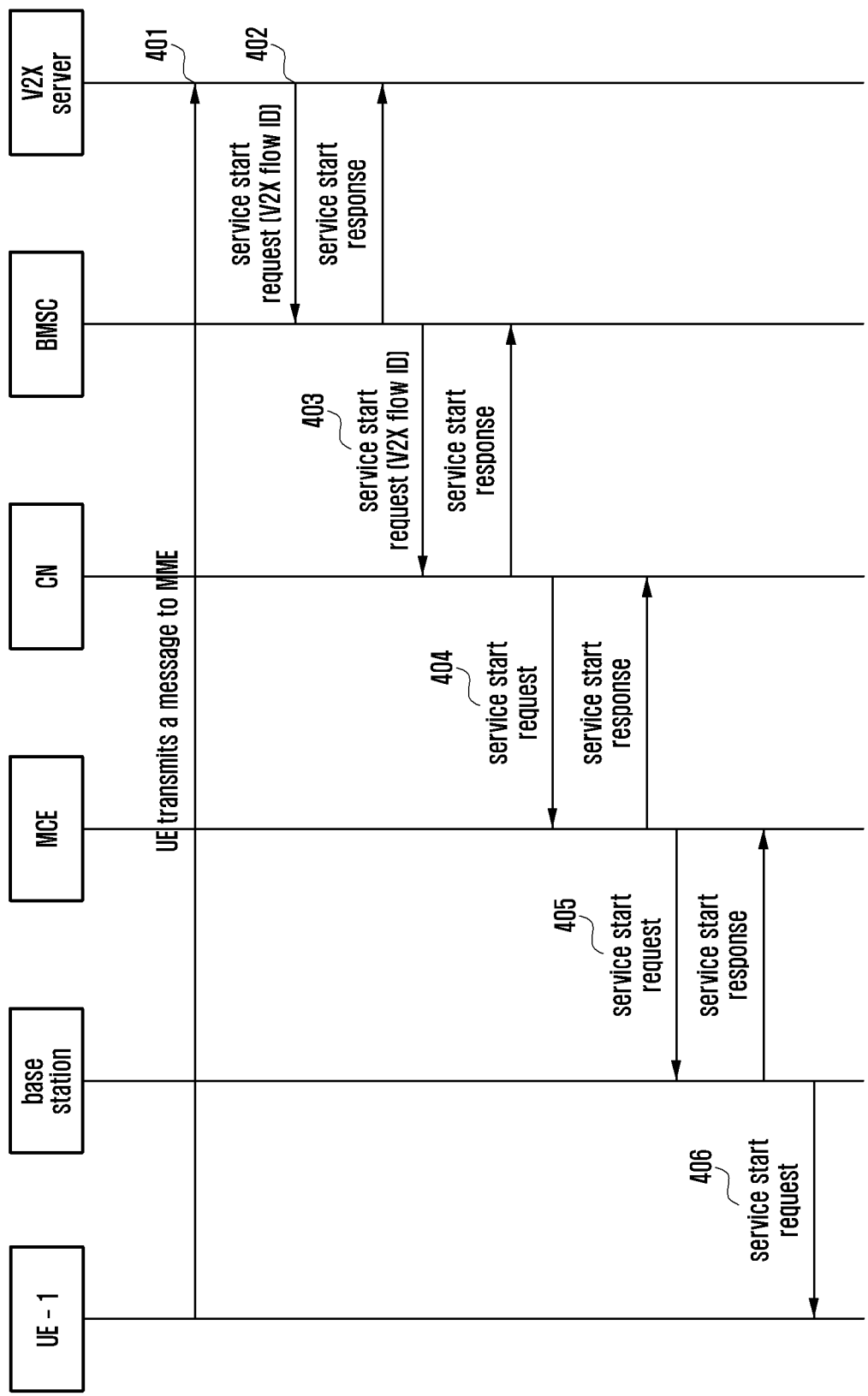
FIG. 4 is a flowchart illustrating how to exchange signaling, in accordance with Embodiment 2 of the present disclosure.

FIG. 4 is a flowchart illustrating how to exchange signaling, in accordance with Embodiment 2 of the present disclosure. FIG. 4 describes that a V2X server determines a broadcast range of a downlink V2X message, based on position reported by a UE. Generally, broadcast within adjacent several cells. The V2X server, or a BMSC may allocate a unique ID for the downlink V2X message, e.g., the ID is referred to as a V2X flow ID, And then, the downlink V2X message flow is uniquely identified on an MBMS bearer.

The V2X message flow refers to one or several V2X messages. These messages have the same type and possess the same broadcast range, e.g, the same MBMS service area. Thus, divide these messages into the same flow. Within the same broadcast range, contents transmitted on the eMBMS bearer are the same. The same eMBMS bearer may carry multiple different V2X message flows. Broadcast ranges corresponding to different V2X message flows are different. That is, MBMS service areas are different. When receiving an uplink V2X message reported by another UE, a server learns that the message should be transmitted on a certain eMBMS bearer, based on type of the V2X message. And the bearer has been established. When a broadcast range corresponding to a V2X message to be broadcast and a MBMS service area of currently broadcast V2X message are different, the server may allocate a new flow ID for the V2X message to be broadcast.

An eMBMS gateway receives a MBMS service start request message, or a MBMS service update request message, and stores contents of foregoing message. The gateway stores a flow ID, and broadcast area corresponding to the flow ID. Service areas corresponding to different V2X message flows may be overlapped to some extent. The gateway or base station may filter data packets of a user plane, based on the flow ID. When receiving a data packet of the user plane, the gateway transmits the data packet to a cell of a correct base station, based on the V2X flow ID (refer to the fourth embodiment) carried by a packet header of the data packet of the user plane, and a stored corresponding relationship between service flow and cell.

In FIG. 4, the flowchart for exchanging signaling includes the following blocks.

In block 401: a UE transmits a message to a V2X server.

The message is an application layer message, which is generally transmitted to the V2X server via a user plane. The UE may report at least one piece of the following information:

type or name of a V2X message; there are multiple kinds of V2X messages, which are applied to different scenes; a V2X message is identified with type or name thereof;

the UE's position information, in which the position information may include at least one piece of the following information:

a unique cell ID of a serving cell, e.g., ECGI of the serving cell;

GPS position information; when the UE is configured with GPS, the GPS information may be reported to the V2X server;

a SAI of a service area located by the serving cell of the UE; the UE obtains the SAI of the cell from a broadcast message of the cell.

information of an adjacent cell, the UE reports the unique ID-ECGI of an adjacent cell of the serving cell to the V2X server. The cell ID list may help the V2X server to determine a broadcast range of the V2X message.

In block 402: the V2X server transmits a control message of MBMS, for example, a MBMS service start request message, or a MBMS service update request message, or other messages, to a BMSC. In the embodiments of the present disclosure, descriptions are provided by taking a MBMS service start request message, or a MBMS service update request message as an example. Other message names may be adopted, when implementing practically.

The V2X server receives the UE's report, and determines whether to transmit an event corresponding to the V2X message to other users, based on the UE's report. The foregoing determining needs to take into account information reported by the UE, and some pre-stored information.

There are multiple cases for the UE's position information received by the V2X server. Examples are respectively provided in the following.

When the UE's position information received by the V2X server is configured to be a unique ID of a serving cell, and type of the V2X service is position-based broadcast service type, the V2X server determines a broadcast range, based on pre-stored information and a serving cell ID reported by the UE. For example, the V2X server pre-stores a topological relation among cells, learns that which cells are deployed around a certain cell, finds an adjacent cell of a serving cell based on the serving cell reported by the UE, and determines that the V2X message needs to be broadcast within the serving cell and a group of adjacent cells. The V2X server transmits the MBMS service start request message to the BMSC. The MBMS service start request message carries a cell ID list. The cell list indicates that the service needs to be broadcast within a corresponding cell.

When the UE's position information received by the V2X server is configured to be GPS position information, and type of the V2X service is position-based broadcast service type, the V2X server determines a broadcast range, based on pre-stored information and GPS position information reported by the UE. For example, the V2X server pre-stores UPS position information of a cell, finds a cell of the position and adjacent information based on event transmission position reported by the UE, and determines that the V2X message needs to be broadcast within the serving cell and a group of adjacent cells. The V2X server transmits the MBMS service start request message to the BMSC. The MBMS service start request message carries a cell ID list. The cell list indicates that the service needs to be broadcast within a corresponding cell.

When the UE's position information received by the V2X server is configured to be SAI, the V2X server determines that the broadcast range is the whole SAI. The V2X server transmits the MBMS service start request message to the BMSC. The MBMS service start request message carries the SAI ID. The SAI ID indicates that the service needs to be broadcast within a cell corresponding to the SAI. Each cell has been allocated with a SAI. A group of corresponding cells may be found, based on the SAI ID.

When receiving an adjacent cell ID reported by the UE, the V2X server may determine that the V2X message needs to be broadcast within which cells, based on other information reported by the UE, such as the ID of the UI's serving cell, and/or, GPS position information of the UE. Information pre-stored by the V2X server may be reduced, by using information of an adjacent cell reported by the UE. For example, the V2X server does not need to learn the topological structure of the cell, and does not need to store GPS position information of each cell.

After determining the broadcast range of the V2X message, there are three different cases for the V2X server.

In a first case: when an eMBMS has not been established currently, the V2X message is the initial V2X message transmitted on the bearer. The V2X server allocates a unique ID for the V2X message flow, e.g., flow ID=1. And then, the V2X server transmits the MBMS service start request message to the BMSC. The MBMS service start request message carries the following information:

--- type of a V2X message
TMGI of a V2X bearer
service quality requirements
flow ID
MBMS service area
The MBMS service area may be configured to be a
cell ID list, such as an ECGI list.
Alternatively, the MBMS service area may be
configured to be a list showing service area IDs, such
as a SAI list, or a list showing other IDs of service areas.

---

In a second case: the server determines a broadcast range of the V2X message, when the eMBMS has already been established currently, the V2X message is not the initial V2X message transmitted on the bearer. There is at least one V2X message transmitted on the bearer. Besides, a first V2X message being transmitted and a second V2X message to be transmitted have the same MBMS service area (the MBMS service area may be configured to be IDs of a group of cells, or IDs of a group of service areas, the MBMS service area indicates a MBMS broadcast range), and then, the V2X server re-uses the allocated flow ID, such as flow ID 1. Subsequently, the V2X server transmits a service update message to the BMSC. The service update message carries the following information:

--- type of a V2X message
TMGI of a V2X bearer
service quality requirements
flow ID
MBMS service area
The MBMS service area may be configured to
be a list showing a group of cell IDs, such as an
ECGI list.
Alternatively, the MBMS service area may be
configured to be a list showing a group of service
areas' IDs, such as a SAI list, or a list showing other
IDs of service areas.

---

In a third case: the server determines a broadcast range of the V2X message; when the eMBMS has already been established at present, the V2X message is not the initial V2X message transmitted on the bearer. There is at least one V2X message transmitted on the bearer. However, a first V2X message being transmitted and a second V2X message to be transmitted have different MBMS service areas. And then, the V2X server allocates a new unique ID for a V2X message flow, such as, flow ID 2. Subsequently, the V2X server transmits the service update message to the BMSC. The service update message carries the following information:

```
type of a V2X message
TMGI of a V2X bearer
service quality requirements
flow ID
MBMS service area
The MBMS service area may be configured to
be a list showing a group of cell IDs, such as an
ECGI list.
Alternatively, the MBMS service area may be
configured to be a list showing IDs of a group of
service areas, such as a SAI list, or a list showing
other IDs of service areas.
```

The flow ID may also be allocated by the BMSC. When the BMSC allocates the flow ID, corresponding to foregoing three cases, the service update message carries TMGI and a broadcast range, without the flow ID. The BMSC allocates the flow ID, based on the broadcast range and TMGI. The allocation method and case are the same as that in block 402, the difference is that the BMSC is responsible for allocating the flow ID.

In block 403: the BMSC transmits a MBMS service start request message to a CN.

The MBMS service start request message carries the following information: a service ID-TMGI, broadcast range, and service quality requirements. The broadcast range may refer to the MBMS service area described in block 402. Alternatively, the BMSC may determine a second service area, based on the MBMS service area (referred to as the first MBMS service area) in block 402 and information pre-stored by the BMSC. The second MBMS service area may be the same as, or different from the first MBMS service area. For example, the broadcast range received by the BMSC is configured to be SAI, and the broadcast range determined by the BMSC is a list of a group of cells. The BMSC receives the MBMS service start request message, or service update message. The BMSC transmits an eMBMS service start request, or an eMBMS service update message to the CN. The foregoing message transmitted by the BMSC to the CN carries the following information: a service ID-TMGI, service quality requirements, flow ID, broadcast range, and so on.

When the BMSC is responsible for allocating the flow ID, actions of the BMSC may be divided into three cases.

In a first case: when an eMBMS has not been established currently, the V2X message is the initial V2X message transmitted on the bearer. The BMSC allocates a unique ID for a V2X message flow, e.g., flow ID 1. And then, the BMSC transmits the MBMS service start request message to the CN. The MBMS service start request message carries the following information.

```
type of a V2X message
TMGI of a V2X bearer
service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

In a second case: the BMSC determines a broadcast range of the V2X message, when the eMBMS has already been established currently, the V2X message is not the initial V2X message transmitted on the bearer. There is at least one V2X message transmitted on the bearer. A first V2X message being transmitted and a second V2X message to be transmitted have the same MBMS service area, and then, the BMSC re-uses the allocated flow ID, such as: flow ID 1. Subsequently, the BNISC transmits the service update request message to the CN. The service update request message carries the following information:

```
type of a V2X message
TMGI of a V2X bearer
service quality requirements
flow ID
MBMS service area
The MBMS service area may be configured to
be a list showing IDs of a group of cells, such as: an
ECGI list.
Alternatively, the MBMS service area may be
configured to be a list showing IDs of a group of
service areas, such as a SAI list, or a list showing
other IDs of service areas.
```

In a third case: the BMSC determines a broadcast range of the V2X message; when the eMBMS has already been established currently, the V2X message is not the initial V2X message transmitted on the bearer. There is at least one V2X message transmitted on the eMBMS bearer. However, a first V2X message being transmitted and a second. V2X message to be transmitted have different MBMS service areas. And then, the BMSC allocates a new unique ID for a V2X message flow, such as flow ID 2. Subsequently, the BMSC transmits the service update message to the CN. The service update message carries the following information.

```
type of a V2X message
TMGI of a V2X bearer
service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

After receiving the request, the CN may transmit a MBMS service start request response, or a service update response message to the BMSC. Here, the CN may include a gateway and a MME. The BMSC firstly transmits the message to the gateway. And then, the gateway re-transmits the MBMS service start request, or service update message to the MME. The foregoing message may carry a TMGI, service quality requirements, a broadcast range, the IP address of the gateway, and so on.

The gateway receives the MBMS service start request message from the BMSC, and stores relevant information of the service. Specifically, the gateway at least stores a service ID, a flow ID, corresponding broadcast range, and other information. Other information may be stored and used based on current technologies. Thus, the present disclosure describes how to store and use flow ID and MBMS service area by a gateway. For example, the MBMS service start request message carries the following information: group ID is configured to be TMGI-1, flow ID is configured to be flow 1D-1, the broadcast range is configured to be ECGI-1 and ECGI-2, and then, the gateway stores service ID, i.e., TMGI-1, flow ID-1, and broadcast range ECGI-1 and ECGI-2.

After foregoing process, when further receiving a first service update request message, the gateway stores service information. Specifically, when the received first service update message carries TMGI-1, flow ID 1, and broadcast range is ECGI-1, ECGI-2 and ECGI-3, the gateway updates the stored contents. The stored contents after being updated are: TMGI-1, flow ID-1, broadcast range-ECGI-1, ECGI-2 and ECGI-3.

After foregoing process, when further receiving a second service update request message, the gateway stores service information. Specifically, when the received second service update message carries TMGI-1, flow ID2, broadcast range ECGI-1, ECGI-2, ECGI-3 and ECGI-4, the gateway stores the following information: TMGI-1, flow ID-2, broadcast range-ECGI-1, ECGI-2, ECGI-3 and ECGI-4.

In block 404: the CN transmits a MBMS service start request message, or a MBMS service update request message to an MCE.

The foregoing message at least carries a service ID-TMGI, MBMS service area, service quality requirements, the IP address of the gateway, and further carries a V2X flow ID. The MCE determines to use MBSFN, or a single-cell point-to-multipoint broadcast. And then, the MCE transmits a MBMS service start request message, or a MBMS service update request to the base station. When a MBMS bearer is established on at least one base station, the MCE transmits a MBMS service start request response, or a MBMS service update response to the MME.

In block 405: the MCE transmits a MBMS service start request message, or a MBMS service update request message to the base station.

The foregoing message at least carries a service ID-TMGI, MBMS service area, service quality requirements, the IP address of the gateway, and further carries a V2X flow ID.

In block 406: the base station transmits a MBMS service start request, or a MBMS service update message to the UE. The base station transmits foregoing message to the gateway of the CN, and establishes a user plane with the gateway, that is, a MBMS data bearer. After receiving the data, the gateway may transmit a data packet to the base station via the bearer.

Until now, the second embodiment is terminated.

FIG. 5 illustrates a third embodiment of the present disclosure, which describes a specific example of a user plane.

A BMSC adds a data packet header for each data packet of the user plane. FIG. 5 illustrates information probably included in the data packet header. In the embodiments of the present disclosure, the data packet header is added with a new ID: a V2X flow ID. A V2X flow refers to one or several V2X messages. The flow ID illustrated in FIG. 5 may be added after a packet data unit (PDU) type, and the flow ID has three bits. The flow ID may also be defined at another position. Length of the flow ID may also be defined with another value. A data packet header of a V2X message further carries a data packet number, a cumulative byte number and a time stamp. Foregoing information makes statistic on data within a flow, e.g., a data packet number, which indicates number of cumulative data packets within a synchronous sequence of a flow. The cumulative byte number refers to a cumulative byte number within a synchronous sequence of a flow.

Figure 6:
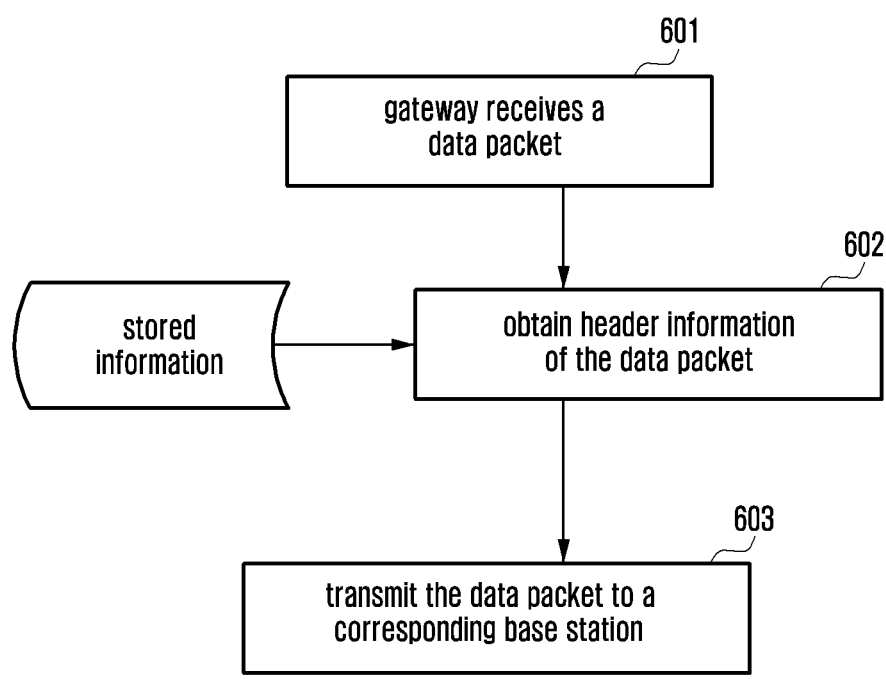
FIG. 6 is a schematic diagram illustrating actions performed by a gateway after receiving user plane data, in accordance with Embodiment 4 of the present disclosure.

FIG. 6 illustrates a fourth embodiment of the present disclosure. The fourth embodiment describes actions performed by a gateway, after receiving data of a user plane, which include the following blocks.

In block 601: a gateway receives a data packet of a user plane, which is transmitted by a BMSC.

In block 602: the gateway obtains packet header information in the data packet.

The data packet header carries contents illustrated in FIG. 5. The gateway further stores a corresponding relationship between flow ID and MBMS service area.

| TMGI | flow ID | corresponding MBMS service area |
|---|---|---|
| e.g., TMGI-1 | 1 | cell 1, cell 3 |
| e.g., TMGI-1 | 2 | cell 1, cell 2, cell 3 |

In block 603: the gateway transmits the data packet to a corresponding base station, based on stored information and header information of the data packet.

Take foregoing stored information as an example, the gateway forwards a data packet with flow ID 1 to base stations of cells 1 and 3, based on stored information and header information of the data packet. The gateway forwards a data packet with flow ID 2 to base stations of cells 1, 2 and 3. These cells may be served by the same base station, or by different base stations. The gateway has already learned information of a base station serving the cell. That is, the gateway has obtained information of a cell served by the base station, which is connected with the gateway. For example, when establishing a S1 interface between the gateway and a base station, the gateway obtains an ID of a cell supported by the base station from a S1 setup request message.

Figure 7:
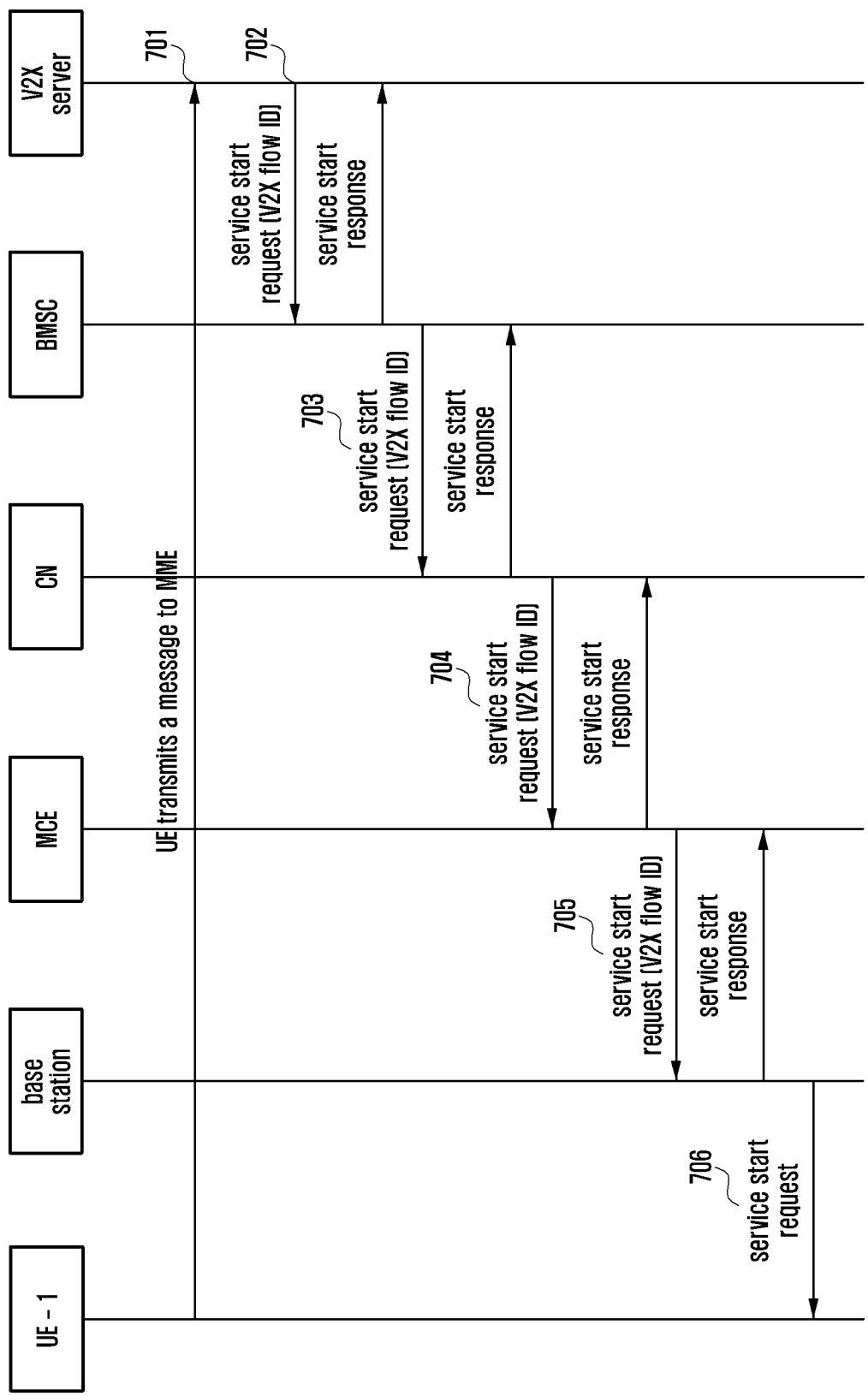
FIG. 7 is a flowchart illustrating how to exchange signaling, in accordance with Embodiment 5 of the present disclosure.

FIG. 7 illustrates a fifth embodiment of the present disclosure. FIG. 7 describes that a V2X server determines a broadcast range of a downlink V2X message, based on position reported by a UE, generally, broadcast within adjacent several cells. The V2X server, or a BMSC, may allocate a unique ID for the downlink V2X message, e.g., the ID is referred to as a V2X flow ID, Functions of the flow ID are to uniquely identify the downlink V2X message flow on an eMBMS bearer. The so-called V2X message flow refers to one or several V2X messages. These messages have the same type, and the same broadcast range, e.g., the same MBMS service area. Thus, divide these messages into the same flow. Broadcast contents are the same within the same broadcast range. The same eMBMS bearer may carry multiple different downlink V2X message flows. Each V2X message flow corresponds to a different broadcast range, that is, corresponds to different MBMS service areas. When receiving an uplink V2X message reported by another UE, the eMBMS bearer needs to carry the uplink V2X message. When a needed broadcast range and currently broadcast V2X message have different MBMS service areas, the server may allocate a new flow ID for a V2X message to be broadcast. The base station receives a MBMS service start request message, or a MBMS service update request message, and stores a corresponding relationship between service flow and broadcast area. Service areas corresponding to different V2X message flows may be overlapped to some extent. The base station may filter data packets of a user plane, based on flow ID. When receiving data of the user plane, the gateway may transmit a data packet to a cell of a correct base station, based on the flow ID in the data packet and a stored corresponding relationship between service flow and cell, by enabling the packet header of the data packet in the user plane to carry the V2X flow (refer to Embodiment 4).

In FIG. 7, the process for exchanging signaling may include the following blocks.

In block 701: a UE transmits a message to a V2X server.

The message is an application layer message, which is generally transmitted to the V2X server via a user plane. The UE may report at least one piece of information in the following:

type or name of a V2X message; there are multiple kinds of V2X messages, which are applied to different cases. A V2X message is identified with type or name thereof;

the UE's position information, in which the position information may include at least one piece of following information:

a unique cell ID-ECGI of a serving cell;

GPS position information, when the LTE is configured with GPS, the GPS information may be reported to the V2X server;

a SAI of a service area located by the serving cell of the UE; the UE obtains the SAI of the cell from a broadcast message of the cell;

information of an adjacent cell, the UE reports the unique ID-ECGI of the adjacent cell of the serving cell to the V2X server. The cell ID list may help the V2X server to determine a broadcast range of the V2X message.

In block 702: the V2X server transmits a MBMS service start request message, or a MBMS service update request message to a BSC.

After receiving the UE's report, the V2X server determines whether to transmit an event corresponding to the V2X message to other users, based on the UE's report. The determining needs to take into account information reported by the UE, and some pre-stored information.

There are multiple cases for the UE's position information received by the V2X server. Examples are respectively provided in the following.

When the UE's position information received by the V2X server is configured to be a unique ID of a serving cell, type of the V2X service is position-based broadcast service type, the V2X server determines a broadcast range, based on pre-stored information and serving cell ID reported by the UE. For example, the V2X server pre-stores a topological relation among cells, learns which cells are deployed around a certain cell, finds an adjacent cell of a serving cell, based on the serving cell reported by the UE, and determines that the V2X message needs to be broadcast within the serving cell and a group of adjacent cells. The V2X server transmits the MBMS service start request message to the BMSC. The MBMS service start request message carries a cell ID list. The cell ID list indicates that the service needs to be broadcast within a corresponding cell.

When the UE's position information received by the V2X server is configured to be GPS position information, type of the V2X service is position-based broadcast service type, the V2X server determines a broadcast range, based on pre-stored information and GPS position information reported by the UE. For example, the V2X server pre-stores GPS position information of the cell, finds the cell of the position and adjacent information, based on event transmission position reported by the UE, and determines that the V2X message needs to be broadcast within the serving cell and a group of adjacent cells. The V2X server transmits the MBMS service start request message to the BMSC. The MBMS service start request message carries a cell ID list. The cell ID list indicates that the service needs to be broadcast within a corresponding cell.

When the UE's position information received by the V2X server is configured to be SAI, the V2X server determines that the broadcast range is the whole SAI. The V2X server transmits the MBMS service start request message to the BMSC. The MBMS service start request message carries a SAI ID. The SAI ID indicates that the service needs to be broadcast within a cell corresponding to the SAI. Each cell is allocated with a SAI. A group of corresponding cells may be found, based on the SAI ID.

When receiving an adjacent cell ID reported by the UE, the V2X server may determine that the V2X message needs to be broadcast within which cells, based on other information reported by the UE, e.g., serving cell ID of the UE, and/or, GPS position information of the UE. Information pre-stored by the V2X server may be reduced, by using adjacent cell information reported by the UE. For example, the V2X server does not need to learn topological structure of the cell, and does not need to store GPS position information of each cell.

After determining the broadcast range of the V2X message, there are three different cases for the V2X server.

In a first case: when an eMBMS has not been established currently, the V2X message is the initial V2X message transmitted on the bearer. The V2X server allocates a unique ID for a V2X message flow, such as flow ID 1. And then, the V2X server transmits a MBMS service start request message to the BMSC. The MBMS service start request message carries the following information:

--- type of a V2X message
TMGI of a V2X bearer
service quality requirements
flow ID
MBMS service area
The MBMS service area may be configured to be a list showing IDs of a group of cells, such as an ECGI list.
Alternatively, the MBMS service area may be configured to be a list showing IDs of a group of service areas, e.g., a SAI list, or a list showing other IDs of service areas.

---

In a second case: the server determines a broadcast range of the V2X message. When the eMBMS has already been established currently, the V2X message is not the initial V2X message transmitted on the bearer. There is already at least one V2X message transmitted on the bearer. Besides, a first V2X message being transmitted and a second V2X message to be transmitted have the same MBMS service area. And then, the server re-uses the allocated flow ID, such as flow ID 1. Subsequently, the V2X server transmits a service update message to the BMSC. The service update message carries the following information:

--- type of a V2X message
TMGI of a V2X bearer
service quality requirements
flow ID
MBMS service area
The MBMS service area may be configured to be a list showing IDs of a group of cells, such as an ECGI list.
Alternatively, the MBMS service area may be configured to be a list showing IDs of a group of service areas, such as a SAI list, or, a list showing other IDs of service areas.

---

In a third case: the server determines the broadcast range of the V2X message. When the eMBMS has already been established currently, the V2X message is not the initial V2X message transmitted on the bearer. There is already one V2X message transmitted on the bearer. However, a first V2X message being transmitted and a second V2X message to be transmitted have different MBMS service areas. And then, the V2X server allocates a new unique ID for the V2X message flow, such as flow ID 2. Subsequently, the V2X server transmits the service update message to the BMSC. The service update message carries the following information.

```
type of a V2X message
TMGI of a V2X bearer
service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

The BMSC may be responsible for allocating the flow ID. Thus, in foregoing three cases, the message carries TMGI and broadcast range, without flow ID. The BMSC allocates the flow ID, based on the broadcast range and TMGI. The allocation method and case are the same as that in block 702. The only difference is that the BMSC takes charge of allocating the flow ID.

In block 703: the BMSC transmits a MBMS service start request message to a CN. The MBMS service start request message carries a service ID-TMGI, broadcast range, and service quality requirements. The broadcast range of the service has been described in block 702. Alternatively, the BMSC may determine a MBMS service area, based on the MBMS service area in block 702 and information of the BMSC. On the basis of the MBMS service start request, or service update message in block 702, the BMSC transmits an eMBMS service start request, or an eMBMS service update message to the CN. The foregoing message carries a service ID TMGI, service quality requirements, a flow ID, broadcast range, and so on.

When the BMSC is responsible for allocating the flow ID, actions performed by the BMSC may be divided into three cases.

In a first case: when the eMBMS has not been established currently, the V2X message is the initial V2X message transmitted on the bearer. The BMSC allocates a unique ID for the V2X message flow, such as flow ID And then, the BMSC transmits the MBMS service start request message to the CN. The MBMS service start request message carries the following information:

```
type of a V2X message
TMGI of a V2X bearer
Service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

In a second case: the BMSC determines the broadcast range of the V2X message. When the eMBMS has already been established currently, the V2X message is not the initial V2X message transmitted on the bearer. There is one V2X message already transmitted on the bearer. A first V2X message under transmission and a second V2X message to be transmitted have the same MBMS service area. And then, the BMSC re-uses the allocated flow ID, such as flow ID 1. Subsequently, the BMSC transmits the service update message to the CN. The service update message carries the following information:

```
type of a V2X message
TMGI of a V2X bearer
service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

In a third case: the BMSC determines the broadcast range for the V2X message. When the eMBMS has already been established currently, the V2X message is not the initial V2X message transmitted on the bearer. There is one V2X message already transmitted on the bearer. However, a first V2X message under transmission and a second V2X message to be transmitted have different MBMS service areas. And then, the BMSC allocates a new unique ID for the V2X message flow, such as flow ID 2. Subsequently, the BMSC transmits the service update message to the CN. The service update message carries the following information.

```
type of a V2X message
TMGI of a V2X bearer
service quality requirements
flow ID
MBMS service area
The MBMS service area may be configured to
be a list showing IDs of a group of cells, such as an
ECGI list.
Alternatively, the MBMS service area may be
configured to be a list showing IDs of a group of
service areas, such as a SAI list, or a list showing
other IDs of service areas.
```

After receiving the request, the CN may transmit a MBMS service start request response, or a service update response message to the BMSC. Here, the CN may include a gateway and a MME. The BMSC firstly transmits the foregoing message to the gateway. And then, the gateway transmits the MBMS service start request, or service update message to the MME. The foregoing message carries a TMGI, service quality requirements, broadcast range, and the IP address of the gateway.

The gateway receives the MBMS service start request message from the BMSC, and stores relevant information of the service. Specifically, the gateway stores a service ID, a flow ID, corresponding broadcast range, and other information. Other information may be stored and used as in conventional technologies. Thus, the present disclosure describes how to store and use the flow ID and MBMS service area by a gateway. For example, the MBMS service start request message carries the following information: group ID is configured to be TMGI-1; flow ID is configured to be flow ID-1; the broadcast range is configured to be ECGI-1 and ECGI-2. Subsequently, the gateway stores TMGI-1, flow ID-1, the broadcast range-ECGI-1 and ECGI-2.

The gateway receives the service update request message, and stores service information. Specifically, when the received service update message carries TIMI-1, flow ID-1, broadcast range-ECGI-1, ECGI-2 and ECGI-3, the gateway updates stored contents. The new stored contents are: TMGI-1, flow ID-1, and broadcast range-ECGI-1, ECGI-2 and ECGI-3.

The gateway receives the service update request message, and stores service information. Specifically, when the received service update message carries TMGI-1, flow ID-2, and broadcast range-ECGI-1, ECGI-2, ECGI-3 and ECGI-4, the stored contents are: TMGI-1, flow ID-2, and broadcast range-ECGI-1, ECGI-2, ECGI-3 and ECM-4.

In block 704: the CN transmits a MBMS service start request message, or a service update request message to an MCE. The foregoing message carries a service ID-TMGI, MBMS service area, service quality requirements, the IP address of the gateway, a V2X flow ID. The MCE determines to use MBSFN mode, or a single-cell point-to-multipoint broadcast. And then, the MCE transmits a MBMS service start request response, or a MBMS service update request to the base station. When a MBMS bearer is established on at least one base station, the MCE transmits a MBMS service start request response, or a MBMS service update response to the MME.

In block 705: the MCE transmits a MBMS service start request message, or a MBMS service update request message to the base station. The foregoing message carries a service ID-TMGI, MBMS service area, service quality requirements, the IP address of the gateway, and a V2X flow ID.

In block 706: the base station transmits a MBMS service start request message, or a MBMS service update message to the UE. The foregoing message carries the service ID. When the base station does not establish a user plane with the gateway, the base station transmits a message to the gateway of the CN, and establishes the user plane with the gateway, that is, a MBMS data bearer. After receiving the data, the gateway may transmit a data packet to the base station via the bearer.

Until now, the fifth embodiment is terminated.

Figure 8:
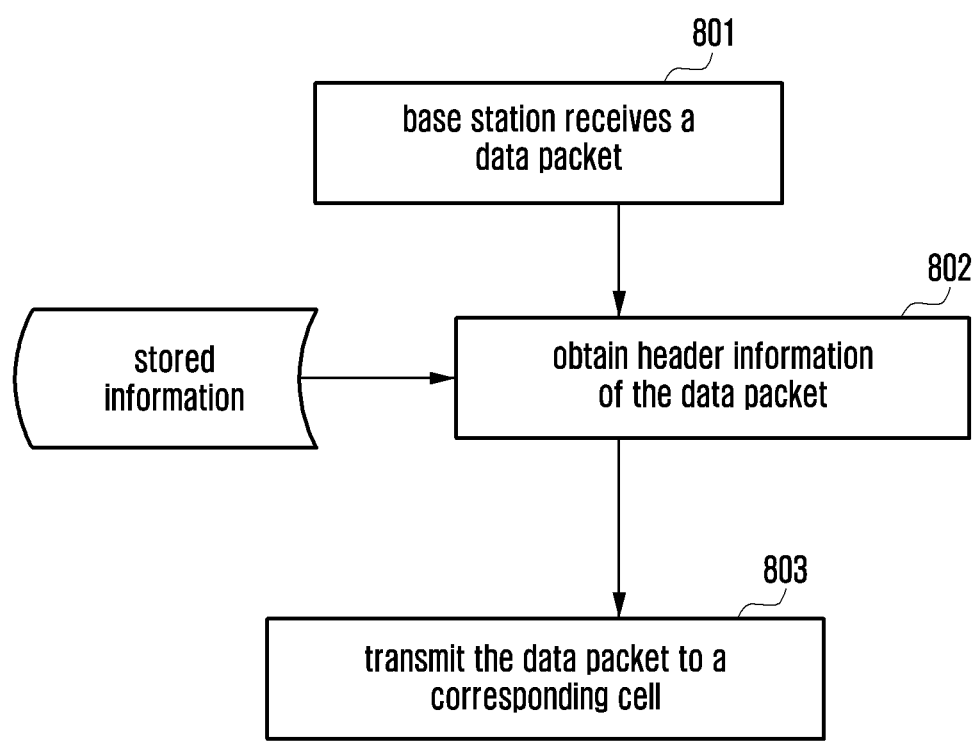
FIG. 8 is a schematic diagram illustrating actions performed by a base station alter receiving user plane data, in accordance with Embodiment 6 of the present disclosure.

FIG. 8 illustrates a sixth embodiment of the present disclosure. The sixth embodiment describes actions performed by a base station after receiving user plane data.

Based on the method illustrated with FIG. 7, the base station obtains a V2X flow ID and corresponding eMBMS service area, and stores a corresponding relationship between flow ID and service area.

In block 801: a base station receives a data packet from a gateway. Format of the data packet is shown in FIG. 5.

In block 802: the base station receives packet header information of the data packet of a user plane. The data packet header carries contents shown in FIG. 5. The base station further stores a corresponding relationship between flow ID and MBMS service area. Suppose cells 1, 2 and 3 are served by the same base station, which are shown in the following:

| TMGI | Flow ID | Corresponding MBMS service area |
|---|---|---|
| e.g., TMGI-1 | 1 | cells 1 and 3 |
| e.g., TMGI-1 | 2 | cells 1, 2 and 3 |

In block 803: the base station transmits the data packet to a corresponding cell.

Take foregoing information stored by the base station as an example, the base station transmits a data packet with flow ID 1 on eMBMS channels of cells 1 and 3, based on stored information and information of data packet header. The base station transmits a data packet with flow ID 2 on eMBMS channels of cells 1, 2 and 3.

Figure 9:
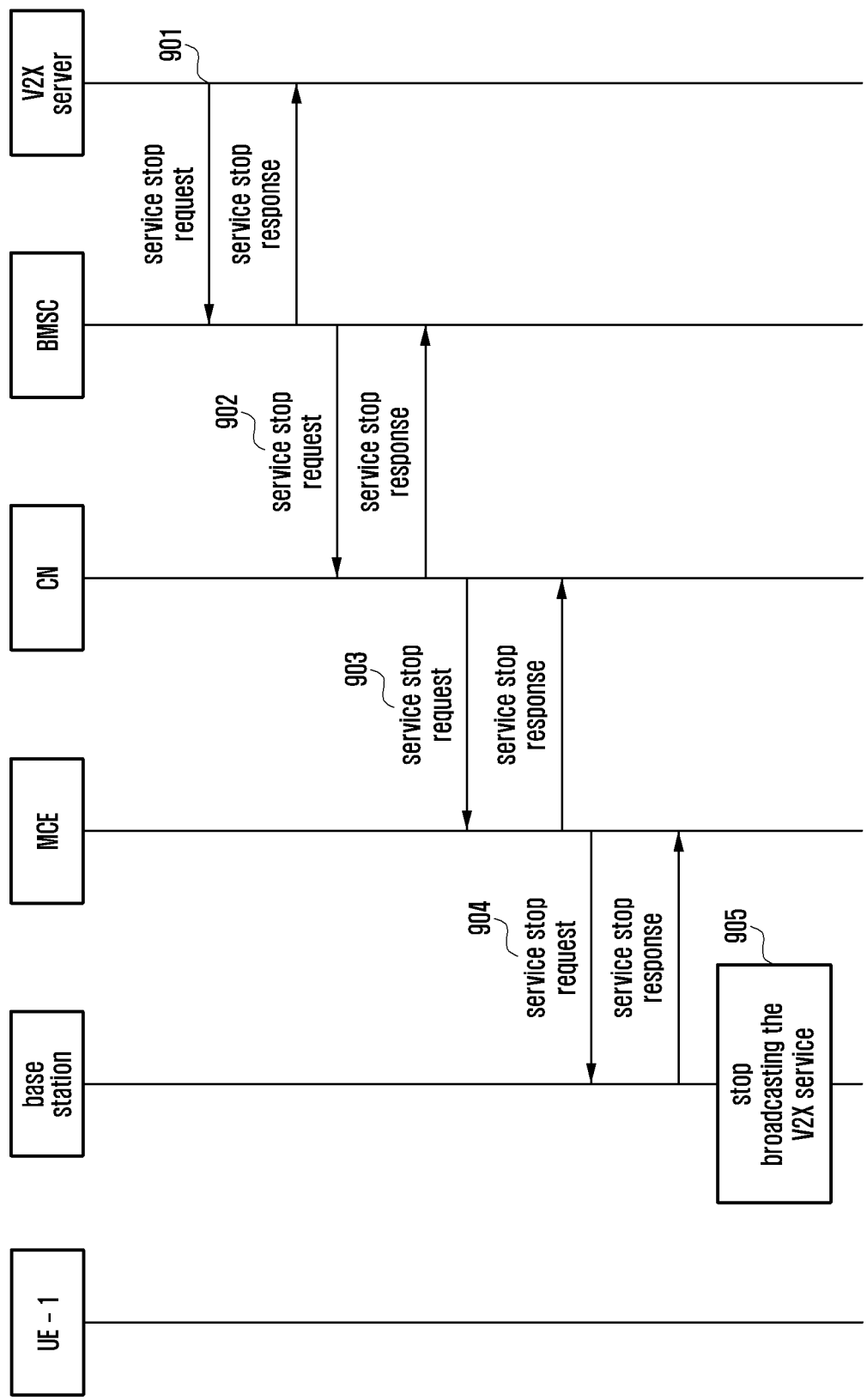
FIG. 9 is a flowchart illustrating how to stop a V2X downlink message, in accordance with Embodiment 7 of the present disclosure.

FIG. 9 illustrates a seventh embodiment of the present disclosure. The seventh embodiment describes a process when a downlink V2X message is stopped, which includes the following blocks.

In block 901: a V2X server transmits a MBMS service stop request message, or a service update request message to a BMSC.

When the V2X service is the last service on the MBMS bearer, the V2X server transmits a service stop message to the BMSC. The service stop message carries a service ID-TMGI, or a connection ID on an interface between the BMSC and the V2X server, in which the connection ID is allocated for the MBMS bearer. When the V2X service is not the last V2X service, the V2X server transmits the service update message to the BMC. The service update message informs the BMSC that a certain V2X service is stopped. There are two methods. A first method is to enable the service update message to carry a V2X flow ID of a V2X flow to be stopped. Based on such ID, the BMSC learns that a corresponding V2X service is stopped. A second method is to enable the service update message to carry V2X flow IDs of all the ongoing V2X flows. The BMSC stores V2X flow IDs of all the V2X flows on the eMBMS bearer. For a V2X flow ID not carried by foregoing message in block 901, the BMSC determines that the corresponding V2X flow is stopped.

In block 902: the BMSC transmits a MBMS service stop request message, or a service update request message to a CN.

When the V2X service is the last service on the MBMS bearer, the BMSC server transmits a service stop message to the CN. The service stop message carries a service ID-TMGI, or a connection ID on an interface between BMSC and CN, in which the connection ID is allocated for the MBMS bearer.

When the V2X service is not the last V2X service, the V2X transmits the service update message to the CN. The service update message informs the CN that a certain V2X service is stopped. There are two methods. A first method is to enable the service update message to carry a V2X flow ID of a V2X flow to be stopped. Based on such ID, the BMSC learns that the corresponding V2X service is stopped. A second method is to enable the service update message to carry V2X flow IDs of all the ongoing V2X flows. The CN stores V2X flow IDs of all the V2X flows on the eMBMS bearer. For a V2X flow ID not carried by foregoing message in block 902 the CN determines that the corresponding V2X flow is stopped.

In block 903: the CN transmits a MBMS service stop request message, or a service update request message to an MCE.

When the V2X service is the last service on the MBMS bearer, a CN server transmits a service stop message to the MCE. The service stop message carries a service ID-TMGI, or a connection ID on an interface between CN and MCE, in which the connection ID is allocated for the MBMS bearer.

When the V2X service is not the last V2X service, the V2X transmits a service update message to the CN. The service update message informs the CN that a certain V2X service is stopped. There are two methods. A first method is to enable the service update message to carry a V2X flow ID of a V2X flow to be stopped. Based on such ID, the MCE learns that a corresponding V2X service is stopped. A second method is to enable the service update message to carry V2X flow IDs of all the ongoing V2X flows. The CN stores V2X flow IDs of all the V2X flows on the eMBMS bearer. For a V2X flow ID not carried by foregoing message in block 902, the MCE determines that the corresponding V2X flow is stopped.

In block 904, the MCE transmits a MBMS service stop request message, or a service update request message to a base station.

When the V2X service is the last service on the MBMS bearer, the CN server transmits a service stop message to the MCE. The service stop message carries a service ID-TMGI, or a connection ID on an interface between CN and MCE, in which the connection ID is allocated for the MBMS bearer.

When the V2X service is not the last V2X service, the V2X transmits the service update message to the CN. The service update message informs the CN that a certain V2X service is stopped. There are two methods. A first method is to enable the service update message to carry a V2X flow ID of a V2X flow to be stopped. Based on such ID, the MCE learns that a corresponding V2X service is stopped. A second method is to enable the service update message to carry V2X flow IDs of all the ongoing V2X flows. The MCE stores V2X flow IDs of all the V2X flows on the eMBMS bearer. For a V2X flow ID not carried by foregoing message in block 904, the MCE determines that the corresponding V2X flow is stopped.

In block 905: the base station stops broadcasting the V2X service via an air interface.

Figure 10:
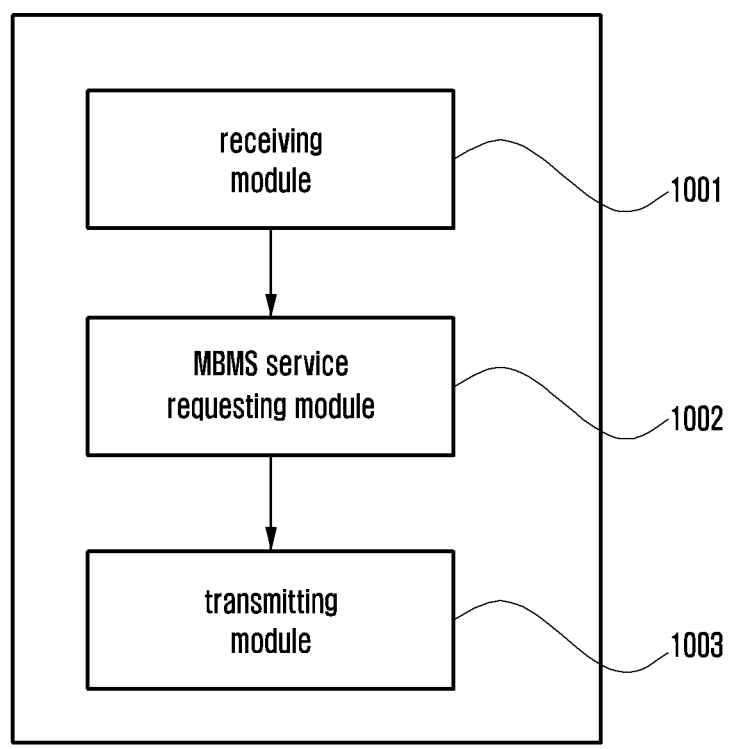
FIG. 10 is a schematic diagram illustrating a structure of a V2X server, in accordance with Embodiment 8 of the present disclosure.

The eighth embodiment of the present disclosure also provides a V2X server. As shown in FIG. 10, the V2X server includes a receiving module 1001, a MBMS service requesting module 1002 and a transmitting module 1003.

The receiving module 1001 is configured to receive a V2X message reported by a vehicle.

The MBMS service requesting module 1002 is configured to allocate a unique flow ID for the V2X message, and transmit a MBMS message to a CN. The MEMS message carries a flow ID and MBMS service area.

The transmitting module 1003 is configured to add the flow ID to a packet header of a MBMS data packet, and then transmit the MBMS data packet in a downlink direction.

Specific processing of each module in the V2X server may refer to foregoing other embodiments.

The ninth embodiment of the present disclosure provides a V2X server, including a receiving module, a MBMS service requesting module and a transmitting module.

The receiving module is configured to receive a V2X message with position information reported by a vehicle.

The MBMS service requesting module is configured to determine a MBMS service area corresponding to the V2X message, based on the position information, and transmit a MBMS message to a CN.

The transmitting module is configured to construct a MBMS data packet corresponding to the V2X message, and transmit the MBMS data packet in a downlink direction.

It should be understood that, although the specification is described with various implementation modes, it does not mean that each implementation mode only includes an independent technical solution. Foregoing narrative way in the specification is only for clarity. Persons having ordinary skill in the art should take the specification as a whole. Other implementation modes understandable by persons having ordinary skill in the art may also be formed, after appropriately combining technical solutions in each provided implementation mode.

The foregoing is only preferred embodiments of the present disclosure, which is not for use in limiting protection scope of the present disclosure. Any modifications, equivalent substitutions or improvements made within the spirit and principle of technical solutions in the present disclosure, should be covered by the present disclosure.

What is claimed is:

1. A method performed by a vehicle to everything (V2X) server in a communication system, the method comprising:
   receiving, from a terminal, a V2X message including location information on the terminal;
   determining a first multimedia broadcast multicast service (MBMS) broadcast area for a V2X service based on the location information on the terminal;
   transmitting, to a broadcast multicast service center (BMSC), a first request message for the V2X service including information on the first MBMS broadcast area and a first temporary mobile group identity (TMGI) for the V2X service, wherein the information on the first MBMS broadcast area includes at least one MBMS service area identification (SAI) mapped to the location information on the terminal; and
   transmitting, to the BMSC, a second request message for the V2X service, the second request message including information on a second MBMS broadcast area for broadcasting second MBMS data for the V2X service and the first TMGI,
   wherein first MBMS data is broadcast within the first MBMS broadcast area, and
   wherein the first TMGI is used for the second MBMS data, in case that the first MBMS broadcast area does not overlap the second MBMS broadcast area.

2. The method of claim 1, wherein a flow identifier allocated for the first MBMS data is different from a flow identifier allocated for the second MBMS data.

3. The method of claim 1, wherein the location information on the terminal includes at least one of a cell identifier (ID) associated with a location of the terminal or geographic location information of the terminal, and
   wherein the information on the first MBMS broadcast area further includes a list of evolved-universal terrestrial radio access network (E-UTRAN) cell global identifiers (ECGIs) mapped to the geographic location information.

4. The method of claim 1, wherein a second TMGI is used for the second MBMS data, in case that the first MBMS broadcast area overlaps the second MBMS broadcast area.

5. The method of claim 1, wherein information associated with the first MBMS broadcast area is transmitted from a core network entity to a base station via a core network (CN).

6. A vehicle to everything (V2X) server in a communication system, the V2X server comprising
   a transceiver; and
   at least one processor configured to:
     receive, from a terminal via the transceiver, a V2X message including location information on the terminal,
     determine a first multimedia broadcast multicast service (MBMS) broadcast area for a V2X service using the location information on the terminal,
     transmit, to a broadcast multicast service center (BMSC), a first request message for the V2X service including information on the first MBMS broadcast area and a first temporary mobile group identity (TMGI) for the V2X service, wherein the information on the first MBMS broadcast area includes at least one MBMS service area identification (SAI) mapped to the location information on the terminal, and transmit, to the BMSC, a second request message for the V2X service, the second request message including information on a second MBMS broadcast area for broadcasting second MBMS data and the first TMGI, wherein first MBMS data is broadcast within the first MBMS broadcast area, and wherein the first TMGI is used for the second MBMS data, in case that the first MBMS broadcast area does not overlap the second MBMS broadcast area.

7. The V2X server of claim 6, wherein a flow identifier allocated for the first MBMS data is different from a flow identifier allocated for the second MBMS data.

8. The V2X server of claim 6, wherein the location information on the terminal includes at least one of a cell identifier (ID) associated with a location of the terminal or geographic location information of the terminal, and wherein the information on the first MBMS broadcast area further includes a list of evolved-universal terrestrial radio access network (E-UTRAN) cell global identifiers (ECGIs) mapped to the geographic location information.

9. The V2X server of claim 6, wherein a second TMGI is used for the second MBMS data, in case that the first MBMS broadcast area overlaps the second MBMS broadcast area.

10. The V2X server of claim 6, wherein information associated with the first MBMS broadcast area is transmitted from a core network entity to a base station via a core network (CN).

11. A method performed by a broadcast multicast service center (BMSC) in a communication system, the method comprising:

receiving, from a vehicle to everything (V2X) server, a first request message for a V2X service based on a V2X message of a terminal, the first request message including information on a first multimedia broadcast multicast service (MBMS) broadcast area and a first temporary mobile group identity (TMGI) for the V2X service, wherein the first MBMS broadcast area is based on location information on the terminal included in the V2X message;

transmitting, to the V2X server, a first response message for accepting the first request message, wherein the first MBMS data is broadcast within the first MBMS broadcast area;

receiving, from the V2X server, a second request message for the V2X service, the second request message including information on a second MBMS broadcast area for broadcasting second MBMS data and the first TMGI; and transmitting, to the V2X server, a second response message for accepting the second request message, in case that the first MBMS broadcast area does not overlap the second MBMS broadcast area, wherein the first TMGI is used for the second MBMS data based on the second response message, and wherein the information on the first MBMS broadcast area includes at least one MBMS service area identification (SAI) mapped to the location information on the terminal.

12. The method of claim 11 further comprising allocating a flow identifier for the second MBMS data which is different from a flow identifier allocated for the first MBMS data.

13. The method of claim 11, wherein the location information on the terminal includes at least one of a cell identifier (ID) associated with a location of the terminal, or geographic location information of the terminal, and wherein the information on the first MBMS broadcast area further includes a list of evolved-universal terrestrial radio access network (E-UTRAN) cell global identifiers (ECGIs) mapped to the geographic location information.

14. The method of claim 11, wherein a second TMGI is used for the second MBMS data, in case that the first MBMS broadcast area overlaps the second MBMS broadcast area.

15. The method of claim 11, further comprising transmitting, to a base station via a core network (CN), information associated with the first MBMS broadcast area.

16. A broadcast multicast service center (BMSC) in a communication system, the BMSC comprising:

a transceiver; and at least one processor configured to:

receive, from a vehicle to everything (V2X) server via the transceiver, a first request message for a V2X service based on a V2X message of a terminal, the first request message including information on a first multimedia broadcast multicast service (MBMS) broadcast area and a first temporary mobile group identity (TMGI) for the V2X service, wherein the first MBMS broadcast area is based on location information on the terminal included in the V2X message, transmit, to the V2X server via the transceiver, a first response message for accepting the first request message, wherein the first MBMS data is broadcast within the first MBMS broadcast area, receive, from the V2X server via the transceiver, a second request message for the V2X service, the second request message including information on a second MBMS broadcast area for broadcasting second MBMS data and the first TMGI, and transmit, to the V2X server via the transceiver, a second response message for accepting the second request message, in case that the first MBMS broadcast area does not overlap the second MBMS broadcast area, wherein the first TMGI is used for the second MBMS data based on the second response message, and wherein the information on the first MBMS broadcast area includes at least one MBMS service area identification (SAI) mapped to the location information on the terminal.

17. The BMSC of claim 16, wherein the at least one processor is further configured to allocate a flow identifier for the second MBMS data which is different from a flow identifier allocated for the first MBMS data.

18. The BMSC of claim 16, wherein the location information on the terminal includes at least one of a cell identifier (ID) associated with a location of the terminal, or geographic location information of the terminal, and wherein the information on the first MBMS broadcast area further includes a list of evolved-universal terrestrial radio access network (E-UTRAN) cell global identifiers (ECGIs) mapped to the geographic location information.

19. The BMSC of claim 16, wherein a second TMGI is used for the second MBMS data, in case that the first MBMS broadcast area overlaps the second MBMS broadcast area.

20. The BMSC of claim 16, wherein the at least one processor is further configured to control the transceiver to transmit, to a base station via a core network (CN), information associated with the first MBMS broadcast area.

* * * * *